United States Patent Office 2,944,038
Patented July 5, 1960

2,944,038

METHOD FOR PREPARING BUTYL RUBBER EMULSIONS

Edward Allen Hunter, Baton Rouge, La., Marnell Albin Segura, Elizabeth, N.J., Augustus Bailey Small, Baton Rouge, La., and Alfred L. Miller, Cranford, N.J., assignors to Esso Research and Engineering Company, a corporation of Delaware No Drawing. Filed May 17, 1956, Ser. No. 585,398

9 Claims. (Cl. 260—23.7)

This invention relates to a method for preparing butyl rubber emulsions and relates more particularly to an improved emulsifier combination for preparing such emulsions.

In copending application Serial No. 544,281, filed November 1, 1955, in the name of Alfred L. Miller, it has been shown that butyl rubber can be used successfully in a tire carcass provided the cord used in preparing the tire is dipped in a dispersion of butyl latex and phenol-formaldehyde type resins prepared in situ at controlled pH. It is, of course, obvious that the success of this technique from a commercial standpoint will be determined in large measure by the latex-making step. If serious difficulties arise in the preparation of the latex or transfer from the laboratory to plant scale operations, final success in commercialization of a butyl tire will be seriously jeopardized.

One of the biggest factors in the preparation of butyl rubber latices is the particular emulsifier system used. Upon this will depend the ease of making and final stability of the latex as well as the strength of the final bond between the cord and the carcass. In addition, very high emulsifier compositions would increase the cost excessively. While many emulsifier systems are suitable for laboratory use, most of these fail when transfer is made to large plant scale operations.

It is therefore the main object of this invention to provide an improved emulsifier system for preparing butyl rubber emulsions.

It is a further object of this invention to provide a method for preparing a butyl rubber latex of improved stability.

It is a still further object of this invention to provide a process of preparing butyl rubber latices in which the mode of operation has been simplified and many attendant difficulties, such as foaming, have been overcome.

Further objects and advantages of the invention will be apparent from the following description when read in connection with the appended claims.

These and other objects and advantages of the invention are accomplished by emulsifying a solution of the butyl rubber in the presence of an emulsifier system comprising a soap of a fatty acid having 12 to 24 carbon atoms as the main emulsifier, polyvinyl alcohol as a stabilizer and as a foam depressant a polyoxyethylated alky phenol containing 7 to 12 ethylene oxide units in which the alkyl group contains 8 to 9 carbon atoms.

The butyl rubber to which the above emulsifier system is applicable in the formation of latex is a copolymer of isobutylene with a multiolefin prepared at low temperature by a Friedel-Crafts catalyst. The major component of the copolymer is preferably isobutylene. The minor component is a multiolefin having from 4 to 12 or 14 carbon atoms per molecule. The preferred multiolefins are butadiene, isoprene, dimethyl butadiene, dimethallyl, myrcene, allo-ocymene and the like. Of these materials, isoprene is presently regarded as the best multiolefin. The isobutylene and the multiolefins are mixed in the ratio of a major proportion of isobutylene and a minor proportion of the isoprene, the preferred range with isoprene being from 1 to 10 parts of isoprene with 99 to 90 parts of isobutylene.

The mixture of monomers is cooled to a temperature within the range between $-40°$ C. and $-164°$ C. The cold mixture is polymerized by the addition thereto of a Friedel-Crafts catalyst, preferably in the liquid or dissolved form. The polymerization proceeds rapidly to yield the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol or other material to inactivate the catalyst. The warm water flashes off the excess refrigerant, unpolymerized olefins and catalyst solvent. The polymer is recovered by straining or filtering or by other means and then dried. Before drying, the polymer shows a molecular weight from 35,000 to about two million.

In one method of practicing the invention the butyl rubber, prepared as described above, is dissolved in a solvent. Suitable solvents which may be used to dissolve the polymer may be any liquid in which the polymer is soluble, such as for example the hydrocarbon solvents hexane, heptane, octane, isooctane, the nonanes, the decanes, naphtha fractions, benzene, toluene, Varsol (straight-run mineral spirits boiling 150°–200° C.—see U.S. Patent 2,733,267), Solvesso 100 (a substantially 100% aromatic hydrocarbon fraction boiling 315–350° F.) and Solvesso 150 (a substantially 100% aromatic hydrocarbon fraction boiling 365–415° F.), cyclohexane, and cyclohexene, carbon tetrachloride, trichloroethylene, carbon disulfide, methyl ethyl ketone and the like. More volatile solvents can be used but pressure equipment would be required to minimize evaporation losses. To this solution is added a fatty acid containing 12 to 24 carbon atoms. An aqueous solution of an alkali metal hydroxide is prepared using an amount of hydroxide in slight excess of that required to neutralize all the fatty acid. A small amount of a polyoxyethylated octyl or nonyl phenol containing 7 to 12 ethylene oxide units and a small amount of polyvinyl alcohol are also added to the hydroxide solution. The two solutions are then mixed in a suitable homogenizer, such as a colloid mill, a sonic mixer, a Dispersator, a Waring Blendor or the like. A particularly suitable homogenizer is a sonic mixer known as The Rapisonic Homogenizer. This consist of a gear pump which forces the material through an orifice and impinges the stream on a knife edge, vibrating blade enclosed in a resonating bell. The hydroxide and fatty acid react to produce a soap in situ which functions as the main emulsifier. The polyvinyl alcohol functions as a protective colloid in the emulsification helping also to stabilize the system during and after the subsequent stripping stages. The polyoxyethylated alkyl phenol acts to suppress foam formation when soaps are used as the emulsifiers and as a stabilizer of the finished latex. The absence of the polyoxyethylated alkyl phenol seriously handicaps the system because of the occurrence of excessive foam during subsequent stripping. This foam spills over into the condensers and lines and makes the process substantially inoperative unless suppressed. The presence of the polyoxyethylated alkyl phenol also reduces the tendency of the finished latex to form surface skin on storage. It is often desirable to preheat the polymer solution and the water separately to as high a temperature as permissible before mixing to reduce difficulties due to viscosity.

After emulsification, the solvent is removed from the emulsion by stripping under vacuum at a temperature above about 100° F. during solvent removal, and near 190° F. during water removal, if a more concentrated latex is desired. Agitation may be needed to prevent hot spots from occurring within the stripping vessel, but it is kept low to minimize mechanical working of the latex during its least stable period.

A particularly suitable emulsifier system within the broad outline above given has been found to be oleic acid 3 to 4 parts by weight per hundred parts of rubber (p.h.r), potassium hydroxide, 0.6 to 0.9 p.h.r. (i.e. from a stoichiometrical amount to a slight excess), polyvinyl alcohol, 2.0 to 3.5 p.h.r. and Triton X-100 (a polyoxyethylated octyl phenol containing 8 to 10 ethylene oxide units), 2.0–4.0 p.h.r. The above ranges are preferred but in all cases additional amounts can be used as desired except that a too great excess of potassium hydroxide should be avoided since too high a pH is conducive to foaming, even though a foam suppressor, such as Triton X-100 is used. Nevertheless, it is desirable to have a slight excess of potassium hydroxide, sufficient to maintain the pH of the aqueous component between 10 and 11. In this way, it has been found possible to reduce the amount of rubber lost by coagulation during subsequent steps in the process, as for example in the emulsification and stripping steps. If the pH of the aqueous component be adjusted to below 9 prior to mixing, 30–50% of the rubber initially used may be lost. Careful control of the pH of the components, however, reduces this loss to a minimum.

Instead of oleic acid, other fatty acids may be used in forming the soap, such as palmitic, linoleic, stearic and other fatty acids containing 12 to 24 carbon atoms. Other alkali metal hydroxides which can be used include sodium hydroxide, lithium hydroxide, caesium hydroxide and rubidium hydroxide. Ammonium hydroxide and its derivatives can also be used. Any of the polyoxyethylated alkyl phenols having from 7 to 12 ethylene oxide units may be used. Triton X-100 and Triton X-45 (having 5 ethylene oxide units) have both been found suitable. In each of these compounds the alkyl group is octyl. However, the use of similar compositions in which the alkyl group is nonyl give equally good results.

The following examples are given to illustrate but not to limit this invention.

*Example I*

A 23% solution of butyl rubber (Staudinger mol. wt. 400,000) in hexane was prepared and 3.4 p.h.r. of oleic acid were mixed in. An equal volume of water containing 3.1 p.h.r. of Triton X-100, 2.7 p.h.r. of partially hydrolyzed polyvinyl alcohol and 0.7 p.h.r. of potassium hydroxide was also prepared and fed together with the butyl rubber solution to a Rapisonic Homogenizer, and recycled about four times. After stripping to remove the hexane and some water an excellent latex was obtained. No foaming or other difficulties were experienced. When this experiment was repeated using high molecular weight butyl rubber (1,200,000 Staudinger) a latex of excellent quality was obtained with no foaming difficulties.

*Example II*

The latex of Example I containing the 400,000 mol. wt. butyl rubber was mixed with a resorcinol-formaldehyde solution in accordance with the following recipe:

| | Percent |
|---|---|
| Latex solids | 15 |
| Resorcinol | 2.2 |
| Formalin (37%) | 3.5 |
| Water | 79.3 |

The pH of the latex mix was adjusted by the addition of a solution of a base such as sodium hydroxide, potassium hydroxide, tetramethyl ammonium hydroxide, etc. to a value between 7.5 and 9. The mix was then aged over night (at least 10 hours) at room temperature. A rayon tire cord was then dipped in the latex and dried in air at 250° F. for five minutes. The dipped and dried cord was finally cured in a butyl carcass composition, compounded according to the following recipe:

| | Parts |
|---|---|
| Butyl rubber | 100 |
| Carbon black | 50 |
| Extender oil | 15 |
| Zinc stearate | 0.5 |
| Zinc oxide | 5.0 |
| Sulfur | 2.0 |
| Tellurium diethyl dithiocarbamate | 1.0 |

The curing was carried out in a mold that provided an "H" test sample piece. The "H" test is that described by Lyons et al., Rubber Chem. Tech. 20:268 (1947), using mold cavity dimensions of 0.380 in. wide, 0.180 in. deep. The adhesions were measured at 75° F., pulled at the rate of 10 inches per minute. A pull of 17 lbs. per cord was obtained with this sample. Additional batches of latices obtained from the same type of recipe showed consistent pulls of between 18 and 20 lbs./cord. When the latex of Example I containing the high molecular weight butyl rubber was used instead of the lower molecular weight rubber latex, a pull of 21 lbs./cord was obtained.

*Example III*

Equal parts of water and a solution of 5–10% butyl rubber in hexane were emulsified in the presence of ten p.h.r (parts per hundred parts of rubber) of Triton X-100 and one part of sodium lauryl sulfate using a laboratory mixer. About 1–2 p.h.r of ammonium alginate was added as a creaming agent. After emulsification the mixture was allowed to stand for about 12 hours during which time about half of the water separated out. After stripping off the solvent the latex spontaneously creamed again, yielding a latex containing about 40% solids. Substantially no coagulation occurred during any of the steps of the process. The resultant final latex possessed excellent storage, mechanical and chemical stability. However, when this recipe (except for the presence of the creaming agent) was mixed in a Rapisonic Homogenizer using a 23% butyl rubber solution, the emulsion broke almost immediately.

*Example IV*

Equal volumes of a 23% solution of butyl rubber in hexane and water containing 5.0 p.h.r. of Pluronic F-68 (a polyoxypropylated glycol), 5.0 p.h.r. of a polyoxyethylated octyl phenol containing 4 ethylene oxide units, 5.1 p.h.r. of a polyoxyethylated octyl phenol containing 5 ethylene oxide units and 2.7 p.h.r. of sodium carboxymethyl cellulose were emulsified in a sonic mixer. When the emulsion was first formed, there was a tendency to form skin. After 24 hours the emulsion broke.

*Example V*

An emulsion was prepared as in Example I using the following recipe:

| | P.h.r |
|---|---|
| Palmitic acid | 6.0 |
| KOH | 2.0 |
| Carboxymethyl cellulose | 2.0 |

The appearance of the initial emulsion was good and remained so after standing 24 hours. However, excessive foaming occurred during stripping.

*Example VI*

An emulsion prepared in accordance with the technique of Example I employing the following recipe broke immediately:

| | P.h.r. |
|---|---|
| Triton X-100 | 3 |
| Sodium lauryl sulfate | 0.3 |
| Polyvinyl alcohol (partially hydrolyzed) | 3 |

Example VII

When Example I was repeated omitting the Triton X-100 and using a 26% butyl rubber solution, an excellent emulsion was obtained but excessive foaming occurred during stripping.

Example VIII

A repetition of Example VII, omitting the polyvinyl alcohol resulted in the emulsion vessel filling with foam and some polymer coming out on the foam crest.

Example IX

A repetition of Example VI using a 32% butyl rubber solution gave an emulsion which formed a heavy layer of rubber on top after standing 24 hours.

Example X

The recipe of Example I was repeated using sodium hydroxide and ammonium hydroxides instead of the potassium hydroxide in accordance with the following recipe:

| | P.h.r. |
|---|---|
| Oleic acid | 3.4 |
| NaOH or NH₄OH | 0.5 |
| Triton X-100 | 2.7 |
| Polyvinyl alcohol (partially hydrolyzed) | 2.4 |

An excellent emulsion was obtained with the NaOH which lost some rubber by oiling out after standing overnight. No oiling out was obtained with the NH$_4$OH.

The above examples clearly show the criticality of the emulsifier system of the present invention given in Example I. Soaps appear to be the best emulsifiers for butyl rubber but are conducive to extreme foam formation. As the Examples VI, VII and IX show, Triton X-100 is not a suitable emulsifier in its own right for butyl rubber but cannot be omitted from the recipe of Example I without excessive foaming and coagulation occurring and without impairing the cord adhesion when used in tire manufacture. Example VIII shows that the omission of polyvinyl alcohol as well as the Triton X-100 makes the process substantially inoperative. Examples III and IV show that emulsifiers suitable in laboratory equipment are unsuitable when used in a vigorous agitator such as the Rapisonic Homogenizer.

While a few embodiments of the invention have been described with considerable particularity, it is not intended that the invention be limited to exactly the methods described as it will be evident that various changes may be made in the details thereof. For example, the potassium oleate component of the emulsifier has been described as being prepared in situ. This is not necessary as it may as well be prepared ahead of time and added to the aqueous solution as such. Other changes may likewise be made in the details of the invention without departing from its principal features and characteristics. For example, the latex may be prepared by dissolving solid butyl rubber in an emulsion of the solvent and water using the emulsifier of this invention and then stripping off the solvent.

The nature of the present invention having been thus fully set forth and specific examples of the same given, what is claimed as new and useful and desired to be secured by Letters Patent is:

1. Process for preparing latices of butyl rubber prepared by low temperature polymerization of a major proportion of isobutylene and a minor proportion of isoprene which comprises emulsifying a solution of the rubber in a hydrocarbon chosen from the group consisting of hexane, heptane, octane, isooctane, the nonanes, the decanes, benzene, toluene, straight-run mineral spirits boiling 150°–200° C., a substantially 100% aromatic hydrocarbon fraction boiling 315°–350° F., a substantially 100% aromatic hydrocarbon fraction boiling 365°–415° F., cyclohexane, cyclohexene, carbon tetrachloride, trichloroethylene, carbon disulfide, and methyl ethyl ketone containing 100 parts by weight of butyl rubber in an aqueous solution of about 3-4 parts by weight based on rubber of an alkali metal soap of a fatty acid containing 12-24 carbon atoms, about 23.5 parts by weight based on rubber of polyvinyl alcohol and about 2-4 parts by weight based on rubber of a polyoxyethylated alkyl phenol having from 8-12 ethylene oxide units in which the alkyl group contains 8-9 carbon atoms, and stripping the hydrocarbon solution from the resulting emulsion.

2. A stable latex of butyl rubber prepared by low temperature polymerization of a major proportion of isobutylene and a minor proportion of a multiolefin comprising 100 parts by weight of butyl rubber emulsified in an aqueous solution containing about 3-4 parts by weight based on rubber of an alkali metal soap of a fatty acid containing 12-24 carbon atoms, about 2-3.5 parts by weight based on rubber of polyvinyl alcohol and about 2-4 parts by weight based on rubber of polyoxyethylated alkyl phenol having from 8-12 ethylene oxide units in which the alkyl group contains 8-9 carbon atoms.

3. A stable latex of butyl rubber prepared by low temperature polymerization of a major proportion of isobutylene and a minor proportion of isoprene which comprises 100 parts by weight of butyl rubber emulsified in an aqueous solution containing about 3-4 parts by weight based on rubber of an alkali metal soap of an unsaturated fatty acid containing 12-24 carbon atoms, 2-3.5 parts by weight based on rubber of polyvinyl alcohol and about 2-4 parts by weight based on rubber of a polyoxyethylated octyl phenol having 8-10 ethylene oxide units.

4. A process for preparing stable latices of butyl rubber prepared by low temperature polymerization of a major proportion of isobutylene and a minor proportion of isoprene which comprises emulsifying a hydrocarbon solution containing 100 parts by weight of butyl rubber in an aqueous solution containing about 3-4 parts by weight based on rubber of an emulsifier consisting of an alkali metal salt of a fatty acid having 12-24 carbon atoms, about 2-3.5 parts by weight based on rubber of a protective colloid consisting of polyvinyl alcohol and 2-4 parts by weight based on rubber of a foam suppressor consisting of a polyoxyethylated alkyl phenol having from 8-12 ethylene oxide units in which the alkyl group contains 8-9 carbon atoms, stripping the resulting emulsion of the hydrocarbon solvent and a part of the aqueous solution and recovering a concentrated emulsion.

5. Process according to claim 1 in which the fatty acid soap is potassium oleate.

6. Process according to claim 1 in which the fatty acid soap is sodium oleate.

7. Process according to claim 1 in which the fatty acid soap is ammonium oleate.

8. Process for preparing latices of butyl rubber prepared by low temperature polymerization of a major proportion of isobutylene and a minor proportion of a multiolefin which comprises emulsifying a solution of the rubber in a hydrocarbon chosen from the group consisting of hexane, heptane, octane, isooctane, the nonanes, the decanes, benzene, toluene, straight-run mineral spirits boiling 150°–200° C., a substantially 100% aromatic hydrocarbon fraction boiling 315°–350° F., a substantially 100% aromatic hydrocarbon fraction boiling 365°–415° F., cyclohexane, cyclohexene, carbon tetrachloride, trichloroethylene, carbon disulfide, and methyl ethyl ketone in presence of 3 to 4 parts per hundred of rubber of an unsaturated fatty acid containing 12 to 24 carbon atoms, 0.6 to 0.9 parts per hundred of rubber of an alkali metal hydroxide, 2.0 to 3.5 parts per hundred of rubber of polyvinyl alcohol, and 2.0 to 4.0 parts per hundred of rubber of a polyoxyethylated alkyl phenol having from 8 to 12 ethylene oxide units in which the alkyl group contains 8 to 9 carbon atoms.

9. Process for preparing latices of butyl rubber prepared by low temperature polymerization of a major proportion of isobutylene and a minor proportion of a multiolefin which comprises emulsifying a hexane solution of the rubber in presence of an aqueous solution containing 3.4 parts of oleic acid per 100 parts of rubber, 0.7 parts per hundred of rubber of potassium hydroxide, 2.7 parts per hundred of rubber of polyvinyl alcohol and 3.1 parts per hundred of rubber of a polyoxyethylated octyl phenol having 8 to 10 ethylene oxide units and stripping the hexane from the resulting emulsion.

References Cited in the file of this patent

UNITED STATES PATENTS

| | | |
|---|---|---|
| 2,138,073 | Schweitzer | Nov. 29, 1938 |
| 2,476,430 | Robbins | July 19, 1949 |
| 2,595,797 | Leyonomark et al. | May 6, 1952 |
| 2,605,242 | Betts et al. | July 29, 1952 |
| 2,658,044 | Anderson | Nov. 3, 1953 |
| 2,769,711 | Wilson | Nov. 6, 1956 |
| 2,773,041 | Larson et al. | Dec. 4, 1956 |
| 2,791,567 | Lowe et al. | May 7, 1957 |
| 2,799,662 | Ernst et al. | July 16, 1957 |

OTHER REFERENCES

Barron: Modern Synthetic Rubbers, 3rd ed., Chapman & Hall Ltd. (1949), page 221.

UNITED STATES PATENT OFFICE
CERTIFICATE OF CORRECTION

Patent No. 2,944,038                      July 5, 1960

Edward Allen Hunter et al.

It is hereby certified that error appears in the printed specification of the above numbered patent requiring correction and that the said Letters Patent should read as corrected below.

Column 6, line 4, for "23.5" read -- 2-3.5 --.

Signed and sealed this 31st day of January 1961.

(SEAL)
Attest:

KARL H. AXLINE
Attesting Officer

ROBERT C. WATSON
Commissioner of Patents